United States Patent

Schuhmacher et al.

Patent Number: 4,967,076
Date of Patent: Oct. 30, 1990

[54] OPTICAL SCANNER PRODUCING MULTIPLE SCAN PATTERNS

[75] Inventors: Chris A. Schuhmacher, San Antonio, Tex.; Rex A. Aleshire, Byesville, Ohio

[73] Assignee: NCR Corporation, Dayton, Ohio

[21] Appl. No.: 447,935

[22] Filed: Dec. 8, 1989

[51] Int. Cl.⁵ .............................. H01J 3/14
[52] U.S. Cl. ................... 250/236; 235/467; 350/6.91
[58] Field of Search ............... 250/234–236; 235/454, 462, 467, 472; 350/6.9, 6.91

[56] References Cited

U.S. PATENT DOCUMENTS

| | | | |
|---|---|---|---|
| 3,589,792 | 6/1971 | Kurotschka | 350/7 |
| 3,631,248 | 12/1971 | Johnson | 250/83.3 H |
| 3,632,871 | 1/1972 | Watkins et al. | 350/6.9 |
| 3,642,343 | 2/1972 | Tchejeyan et al. | 350/6 |
| 3,889,102 | 6/1975 | Dahlquist | 235/61.7 R |
| 3,978,317 | 8/1976 | Yamaguchi et al. | 235/61.11 |
| 3,995,166 | 11/1976 | Hobart et al. | 250/566 |
| 4,256,364 | 3/1981 | Minoura et al. | 350/6.9 |
| 4,266,847 | 5/1981 | Menke | 350/6.6 |
| 4,418,276 | 11/1983 | Yatsunami | 235/462 |
| 4,432,598 | 2/1984 | Akanabe et al. | 350/6.7 |
| 4,560,862 | 12/1985 | Eastman et al. | 235/467 |
| 4,626,063 | 12/1986 | Honey | 350/6.9 |
| 4,738,499 | 4/1988 | Mikami et al. | 350/3.71 |
| 4,738,500 | 4/1988 | Grupp et al. | 350/6.6 |
| 4,777,568 | 10/1988 | Solomon | 350/6.91 |
| 4,795,224 | 1/1989 | Goto | 235/467 |
| 4,861,973 | 8/1989 | Hellekson et al. | 235/467 |
| 4,871,904 | 10/1989 | Metlisky et al. | 235/467 |
| 4,887,019 | 12/1989 | Reis et al. | 350/6.9 |

Primary Examiner—David C. Nelms
Assistant Examiner—Stephone B. Allen

[57] ABSTRACT

An optical scanning unit for scanning a bar code includes a plurality of rotatably mounted pattern forming mirrors which are rotated during a single revolution of a drive shaft to generate a plurality of successively larger scan patterns. Each of the mirrors includes a cam portion which is engaged by a roll member driven by a disk member which in turn is rotated by the drive shaft. Biasing members return the mirrors to their home position at the completion of one revolution of the drive member.

17 Claims, 4 Drawing Sheets

OPTICAL SCANNER PRODUCING MULTIPLE SCAN PATTERNS

BACKGROUND OF THE INVENTION

The present invention relates to optical scanning devices and more particularly to a portable scanning device for generating a plurality of different size scan patterns for scanning a coded label.

In present-day merchandising point-of-sale checkout systems, data pertaining to the purchase of a merchandise item is obtained by reading data encoded indicia such as a bar code label printed on or attached to the purchased merchandise item. Reading systems which have been constructed to read this type of bar code include stationary optical scanning systems normally located within the cabinet structure of a checkout counter or hand-held laser scanners which emit a single or multiple line scan pattern which are manually moved past the bar code label that is to be read. In prior scanners, the scan pattern is generated by deflecting a number of scanning light beams off a plurality of pattern mirrors. The number of scanning lines in the scan pattern is determined by the number of scanning beams generated or the number of pattern mirrors utilized. The more lines in the pattern produce a more efficient scanning operation. Depending on the size of the bar code label to be read, prior hand held scanning units have utilized interchangeable scanning heads which produce different scanning patterns which vary in the size and the number of scan lines forming the scan pattern. It would be desirable to have a hand-held scanning unit that would be able to generate a number of different size scanning patterns each of which would scan different size bar code labels with the same efficiency.

SUMMARY OF THE INVENTION

There is provided, in accordance with the present invention, an optical scanning device which may be mounted in a portable hand-held scanner or other types of optical scanners. The scanning unit includes a housing within which is mounted a motor for rotating a hollow drive shaft through 360 degrees. Mounted adjacent one end of the shaft is a laser which projects a laser light beam through the shaft. Mounted on the other end of the shaft is a rotating deflector which deflects the light beam outwardly towards a ring of pattern mirrors mounted for rotational movement. The housing includes a disk member supporting a plurality of arm members each of which rotatably supports one of the pattern mirrors. Each of the pattern mirrors has a cam portion which is engaged by a drive member secured to a rotating ring member which is operated by rotation of the drive shaft. Movement of the drive member along the cam portion rotates the pattern mirror against the action of a biasing member secured to the disk member and engaging the pattern mirror to urge the pattern mirror to a home position. Rotation of each of the pattern mirrors changes the angle of incidence of the light beam striking the pattern mirrors which deflect the light beam at a number of angles creating a plurality of scanning light beams which increases the size of the scan pattern. During one revolution of the drive shaft, each of the drive members on the ring member will successively engage and rotate each of the mirrors producing a fluctuating scan pattern for scanning a bar code label.

It is therefore a principal object of this invention to provide an optical scanning device which varies the size of the scan pattern during operation of the device;

It is another object of this invention to provide a compact optical scanning device which increases the number of scan lines during a single operation of the scanning device.

It is a further object of this invention to provide an optical scanning device which can read multi-size coded labels, and which is simple in construction and low in cost.

These and other objects, features, and advantages of the present invention will become apparent from the following description and the attached drawings.

DETAILED DESCRIPTION OF THE PREFERRED EMBODIMENT

Figure 1:
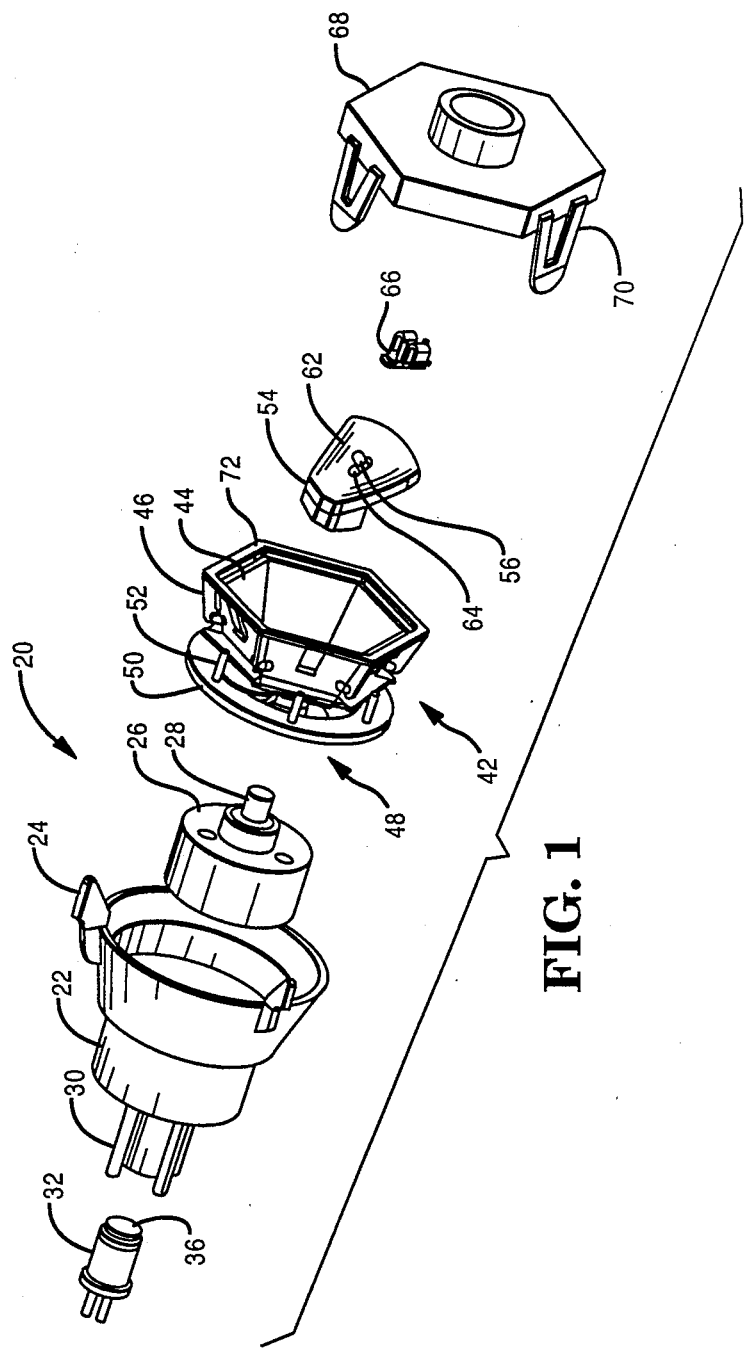
FIG. 1 is an exploded view of a scanning unit which incorporates the present invention showing the elements which generate a plurality of scanning patterns.

Referring now to FIG. 1, there is shown an exploded view of a scanning unit incorporating the present invention which may be mounted in a hand-held scanner. While the present invention is shown mounted in a hand-held optical scanner, it is obvious that the present invention may be employed with any type of optical scanning unit which utilizes pattern mirrors for generating a scan pattern. The scanning unit generally indicated by the numeral 20 is fully disclosed in copending U.S. patent application Ser. No. 386,377, which application is assigned to the assignee of the present application.

Figure 2:
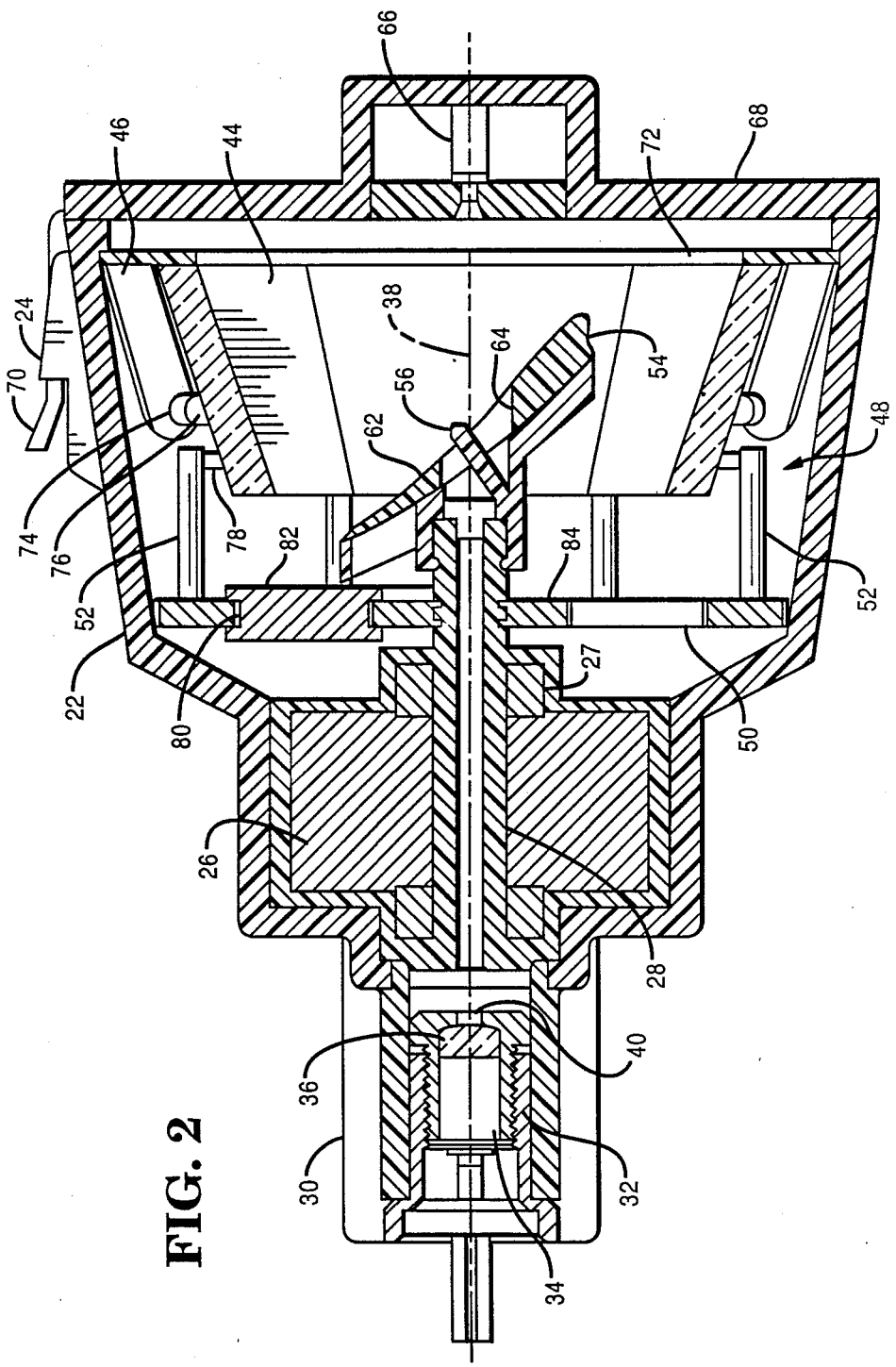
FIG. 2 is a sectional side view of the scanning unit shown in FIG. 1.

As shown in FIG. 1 and in FIG. 2, which is a cross sectional view of the scanning unit, the scanning unit 20 includes a molded frame support member 22 having a plurality of latching portions 24. The frame support member 22 may be molded of any type of shock resistant plastic material such as polycarbonate. Mounted within the support member 22 is a motor 26. Journaled within the motor by bearings 27 (FIG. 2) is a hollow drive shaft 28 extending through the motor 26. Mounted within a rear extension portion 30 of the frame support member 22 is a brass laser diode member 32 supporting a laser diode 34 (FIG. 2) and a collimating and focusing lens member 36 both of which are in alignment with the spin axis 38 (FIG. 2) of the drive shaft 28. The diode 34 outputs a diverging light beam which is collimated and focused on a reference plane (not shown) in front of the scanning unit by the lens member 36. A circular aperture stop 40 (FIG. 2) positioned adjacent the lens member 36 has a cross-section which is smaller than the lens member 36 for controlling the size of the laser light beam projected at the reference plane in a manner that is well known in the art.

Mounted within the frame support member 22 is a pattern mirror assembly generally indicated by the numeral 42 (FIG. 1) which includes a plurality of pattern mirror members 44 each of which is rotatably mounted on an arm member 46 for movement in a counterclockwise direction as viewed in FIG. 2 to vary the angle of the mirrors with respect to the spin axis 38 of drive shaft 28. The mirror members 44 are operated by a drive mechanism generally indicated by the numeral 48 (FIGS. 1 and 2) which includes a rotating ring member 50 on which are mounted a plurality of roll members 52 each of which engages an associated mirror member 44 to rotate the mirror member in a manner that will be described more fully hereinafter.

Secured to the front end of the drive shaft 28 is an optical transceiver 54 comprising a flat deflecting mirror portion 56 which, as shown in FIG. 2, extends obliquely across the spin axis 38 to deflect the laser light beam projected along the spin axis towards the pattern mirror members 44 which deflect the light beams in the form of a scan pattern 58 (FIG. 6) for scanning a coded label 60. The transceiver 54 further includes a collection mirror portion 62 for collecting the scanning light beams reflected from the scanned coded label 60. As seen in FIGS. 1 and 2, the deflecting mirror portion 56 extends through an aperture 64 in the collection mirror portion 62 of the transceiver 54.

The collection mirror portion 62 will deflect the collected light beams towards a photodetector member 66 mounted within a transparent support member 68 (FIGS. 1 and 2) having a plurality of flexible finger members 70 which snap over the latching portions 24 of the frame support member 22 for securing the support member 68 to the support member 22.

Referring now to FIGS. 2-5 inclusive, there are shown views and details of the pattern mirror assembly 42 (FIG. 1) which includes a disk-shaped support member 72 snapped into the front portion of the frame support member 22 (FIG. 2). The support member 72 has mounted thereto the arm members 46, to each of which is rotatably mounted, within an aperture 74 in the arm member 46, one end of a curved stud member 76 whose other end is molded to one side of an associated pattern mirror member 44. As seen from FIGS. 3 and 4, each mirror member 44 has two stud members 76 molded to opposite sides of the mirror member each of which is rotatably secured to adjacent arm members 46.

Figure 3:
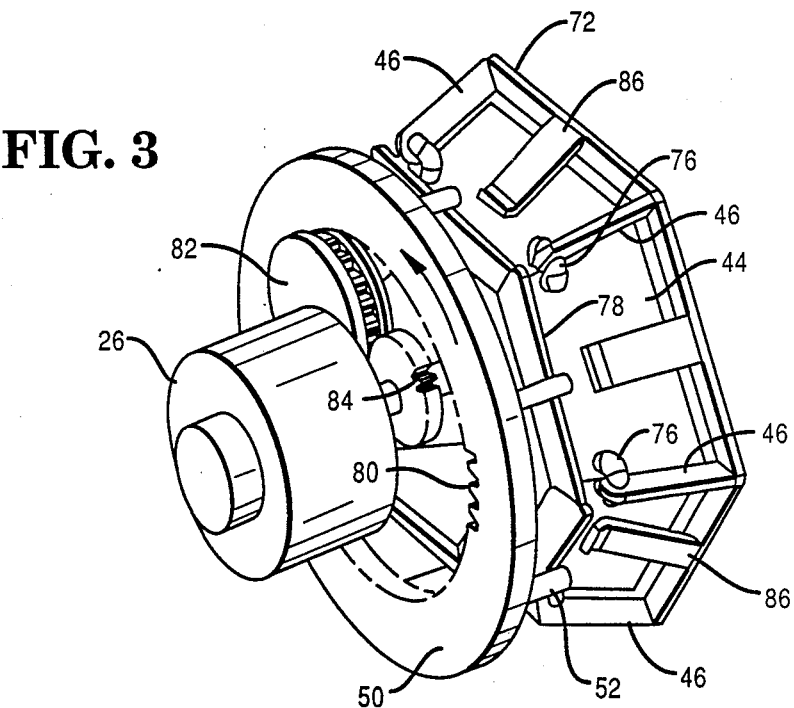
FIG. 3 is a perspective rear view of the pattern mirror assembly showing details of the mirror actuating mechanism and the scanning unit drive mechanism.
Figure 4:
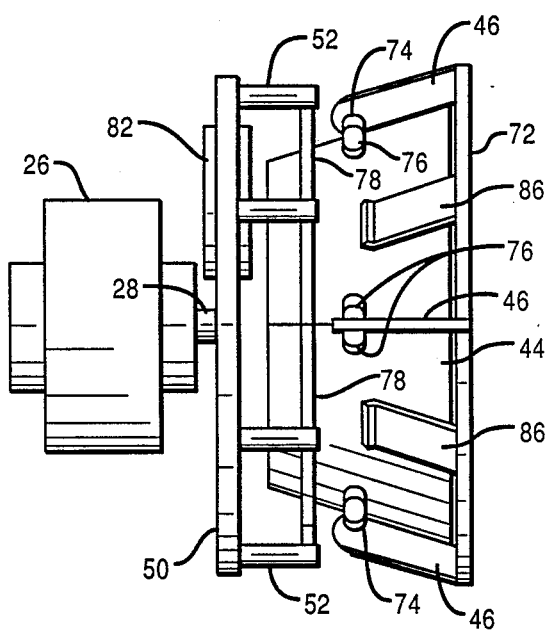
FIG. 4 is a side view of the pattern mirror assembly shown in FIG. 3.

Molded adjacent the rear edge of each mirror member 44 is a wedge or cam portion 78 which slopes in an upward direction from one edge to the opposite edge of the mirror member 44 when moving in the direction of the arrow on the ring member 50 (FIG. 3). Engaging the cam portion 78 of each mirror member 44 is one of the roll members 52 (FIGS. 1-5 inclusive) secured to the ring member 50. As best seen in FIGS. 2 and 3, the ring member 50 has located around the periphery of its inner edge a plurality of gear teeth 80 which engage a gear member 82 which in turn engages a gear member 84 secured to the drive shaft 28.

Figure 5:
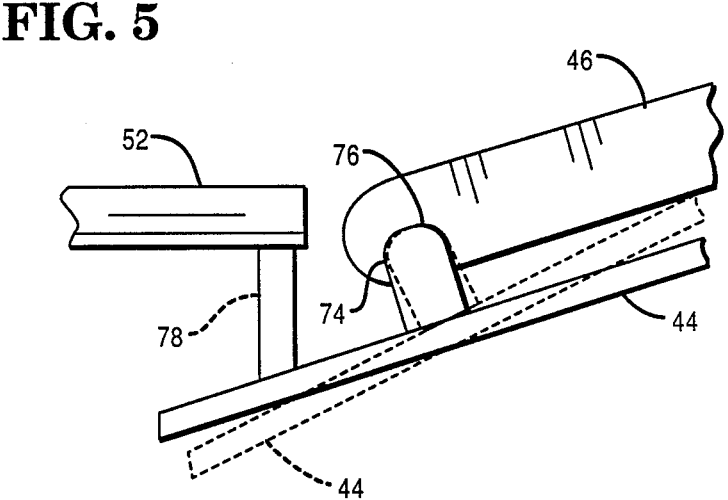
FIG. 5 is a partial detailed view of the pivot mechanism of the pattern mirrors.
Figure 6:
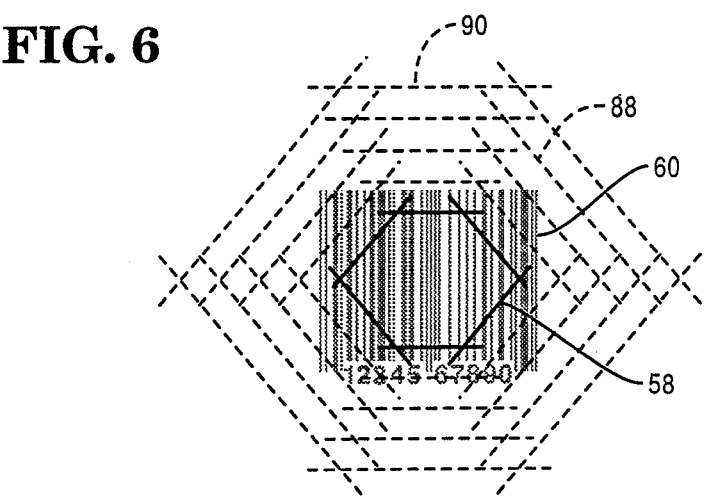
FIG. 6 is a plan view of the scan patterns for scanning a coded label generated by the present invention.

Clockwise rotation of the drive shaft 28 results in the rotation of the ring member 50 in the direction illustrated by the arrow in FIG. 3. This rotation of the ring member 50 which is slower than that of the drive shaft 28 will move each of the roll members 52 along the cam portion 78 of its associated mirror member 44. As seen in FIG. 5, movement of the roll member 52 along the cam portion 78 will cam the mirror member 44 counterclockwise about the end of the stud member 76 mounted in the arm member 74 to the position shown in dotted lines. This changes the angle of the mirror member 44 in relation to the transceiver 54 which increases the angle of incidence of the light beams striking the mirror member. When this occurs, the scanning light beams deflected by the transceiver 54 will strike each pattern mirror member 44 "n" times before the mirror members return to their home position. This action creates "n" individual scan lines at different points in space for each individual mirror member. As the mirror members are rotated counterclockwise around an axis which is perpendicular to the path of the light beams striking the mirror members during one revolution of the drive shaft 28, the scan pattern increases outwardly in a circular fashion as shown in FIG. 6. This will continue until the roller members 52 reach the end of the cam portion 78 of the mirror members 44 at which time they will release the mirror members to return to their home positions, in the manner described hereinafter. It will thus be seen that during one revolution of the drive shaft 28, the rotation of the ring member 50 results in each of the mirror members 44 being engaged by each of the roller members 52 generating a fluctuating scan pattern during the scanning of the bar code label.

The counterclockwise rotational movement of each of the mirror members 44 is resisted by a flexible arm member 86 (FIGS. 3 and 4) secured to the support member 72 and having its free end engaging the mirror member 44. The action of the arm member 86 will bias the cam portion 78 of the mirror member into engagement with the roll member 52 providing a continuous rotational movement of the mirror members 44 during operation of the scanning unit. The arm member 86 will also return its associated mirror member to its home position at the completion of the engagement of the roll member 52 on the cam portion 78 prior to the engagement of the next roll member 52 with the cam portion 78.

As seen in FIG. 6, the mirror members 44 will initially generate the scan pattern 58, when in their home positions onto the coded label 60. As previously described, the mirror members 44 will be rotated outwardly during a single revolution of the drive shaft 28 producing a series of ever larger scan patterns 88 until the scan pattern reaches a maximum size 90 thus increasing the density and the scan area of the scan pattern. It will thus be seen that during operation of the scanning unit 20, the pattern mirror members 44 will cyclically generate the scan patterns 58, 88 and 90.

There are three factors that control the size and density of the scan pattern generated by the present invention:

(1) The slope of the cam portion 78 of the mirror members 44. Increasing the slope of the cam portion 78 increases the angle of incidence of the scanning light beam on the mirror member causing the light beam to be deflected more away from the center of the mirror member.
(2) The initial setting of the mirror members 44 will determine the density of the scan pattern when the mirror members are in a home position.
(3) The rotational speed of the drive shaft 28 with respect to the rotational speed of the ring member 50. The higher the ratio of these two speeds, the greater the density of the scan pattern.

It will be seen that the pivoting action of the mirror members enables each mirror member to become more efficient in producing the number of scan lines that make up the scan pattern. By changing the three variables: degree of angle change, speed of the drive shaft 28 and speed of the ring member 50, the density and size of the scan pattern can be changed. For example, with no pivoting mirror members, a 6 inch diameter circle would be covered. With the pivoting mirror members, that diameter may be expanded up to 18 inches.

Although the presently preferred embodiment of the invention has been described, it will be understood that various changes may be made within the scope of the appended claims.

What is claimed is:

1. An apparatus for projecting scanning beams at coded indicia comprising:
   a source of scanning light beams;
   means for directing the scanning light beams along a first light path;
   means mounted in said first light path for deflecting the light beams along a plurality of second light paths;
   rotatably mounted reflecting means mounted in each of said second light paths for reflecting the light beams along a third light path which scans coded indicia, said third light paths forming a first scanning pattern; and
   actuating means engaging each of said reflecting means for rotating each of said reflecting means with respect to said second light paths enabling the reflecting means to reflect the light beams along a plurality of fourth light paths forming a second scanning pattern for scanning the coded indicia.

2. The apparatus of claim 1 in which said reflecting means comprises mirror means mounted for rotation about an axis perpendicular to said second light paths, said mirror means including a cam portion extending from a surface of the mirror means and said actuating means including at least one actuating member engaging said cam portion and adapted for movement along said cam portion to rotate the mirror means with respect to said second light paths to reflect the light beams along said fourth light paths.

3. The apparatus of claim 2 in which said directing means includes a rotating drive member, said apparatus further including a first support member operatively connected to said drive member and secured to said at least one actuating member and adapted for movement upon rotation of said drive member whereby said at least one actuating member is moved along said cam portion to rotate the mirror means.

4. The apparatus of claim 3 which further includes biasing means engaging the mirror means for biasing the mirror means in a direction opposite to the movement of the mirror means by said at least one actuating member.

5. The apparatus of claim 3 in which said first support member comprises a ring member to which is mounted said at least one actuating member, said actuating means further including gear means secured to said drive member and engaging said ring member for rotating the ring member upon rotation of the drive member.

6. The apparatus of claim 3 which further includes a second support member positioned adjacent said mirror means and a plurality of third support members secured to said second support member and rotatably mounting said mirror means.

7. The apparatus of claim 1 in which the size of the second scanning pattern is greater than the size of the first scanning pattern.

8. The apparatus of claim 5 in which the rotation of the ring member results in the rotation of the mirror means to an actuated position forming said second scanning pattern during one revolution of the ring member, said biasing means returning the mirror means to their home position at the completion of one revolution of the drive member.

9. The apparatus of claim 8 in which said mirror means produce a plurality of third scanning patterns during movement to said actuated position, each of said third scanning patterns being successively larger than the previous third scanning pattern, but smaller than said second scanning pattern.

10. An apparatus for projecting scanning light beams at a coded label comprising:
    a source of scanning light beams;
    a drive member through which the scanning light beams are projected along a first light path;
    means for rotating the drive member;
    deflecting means secured to said drive member and positioned in said first light path for deflecting the light beams in a plurality of second light paths;
    a plurality of mirror members each mounted in one of said second light paths for reflecting the light beams in a plurality of third light paths forming a first scan pattern which scans the coded label, each of said mirror members including a cam portion;
    a first support member mounted adjacent each of said mirror members;
    a plurality of arm members secured to said support member and each positioned adjacent one of said mirror members;
    means rotatably mounted to each of said arm members and secured to an associated mirror member for rotatably supporting said mirror member; and
    actuating means operated by said drive member and engaging the cam portion of each of the mirror members for rotating each of the mirror members with respect to said second light paths enabling the mirror members to reflect the light beams along a plurality of fourth light paths forming a second scanning pattern for scanning the coded label.

11. The apparatus of claim 10 in which the size of the second scanning pattern is greater than the size of the first scanning pattern.

12. The apparatus of claim 10 which further includes a plurality of resilient members secured to said first support member and each engaging one of said mirror members for normally returning the mirror members to their original position forming said first scanning pattern.

13. The apparatus of claim 12 in which said actuating means rotates said mirror members to an actuated position forming said second scanning pattern during one revolution of the drive member, said resilient members returning the mirror members to their original position at the completion of one revolution of the drive member.

14. The apparatus of claim 10 in which said mirror members form a plurality of third scanning patterns during movement to said actuated position, each of said third scanning patterns being successively larger than the previous third scanning pattern, but smaller than said second scanning pattern.

15. The apparatus of claim 10 in which said actuating means includes a second support member operatively connected to said drive member and a plurality of actuating members secured to said second support member each engaging the cam portion of one of said mirror members for rotating each of said mirror members in a direction to change the angle of incidence that the light beams strike the mirror members.

16. The apparatus of claim 15 in which said actuating means also includes gear means secured to said drive member and engaging said second support member for rotating the second support member upon rotation of the drive member.

17. The apparatus of claim 16 in which said actuating means includes a ring member engaging said gear means and each of said actuating members comprises a roll member secured to said ring member and which extends to a position adjacent the cam portion of an associated mirror member for moving along said cam portion during operation of said drive member.

* * * * *